United States Patent [19]

van Michaels

[11] Patent Number: 4,519,206
[45] Date of Patent: May 28, 1985

[54] MULTI-FUEL ROTARY POWER PLANTS USING GAS PISTONS, ELLIPTIC COMPRESSORS, INTERNALLY COOLED THERMODYNAMIC CYCLES AND SLURRY TYPE COLLOIDAL FUEL FROM COAL AND CHARCOAL

[76] Inventor: Christopher van Michaels, 1817½ N. Las Palmas Ave., Los Angeles, Calif. 90028

[21] Appl. No.: 156,563

[22] Filed: Jun. 5, 1980

[51] Int. Cl.³ .............................................. F02C 7/00
[52] U.S. Cl. .................................... 60/39.54; 418/54
[58] Field of Search ............... 60/39.182, 39.19, 39.44, 60/39.54, 39.75, 39.464, 269; 418/54

[56] References Cited

U.S. PATENT DOCUMENTS

| | | | |
|---|---|---|---|
| 1,552,272 | 9/1925 | Carner | 60/39.44 X |
| 2,933,886 | 4/1960 | Sharma | 60/39.75 X |
| 3,656,875 | 4/1972 | Luck | 418/54 |
| 3,869,863 | 3/1975 | Juge | 60/39.19 |
| 3,995,421 | 12/1976 | Kuroiwa | 60/39.54 X |
| 4,006,591 | 2/1977 | Cervenka | 60/39.75 X |
| 4,138,847 | 2/1979 | Hill | 60/519 X |
| 4,333,309 | 6/1982 | Coronel | 60/39.182 X |

Primary Examiner—Stephen F. Husar

[57] ABSTRACT

A multi-fuel rotary power plant using novel internal cooling and energy saving thermodynamic cycles, gas pistons, the unique rotary centers of the ellipse in a novel compressor and a slurry type fuel made out of colloidal carbon, hydrocarbon and other solvents. These rotary power plants are designed for universal application such as engines for large industrial compressors, cars, electrical power plants, marine and jet propulsion engines. These multi-purpose engines do not require design changes other than sizing for each application and an exhaust pipe change for the case of jet propulsion applications.

4 Claims, 18 Drawing Figures

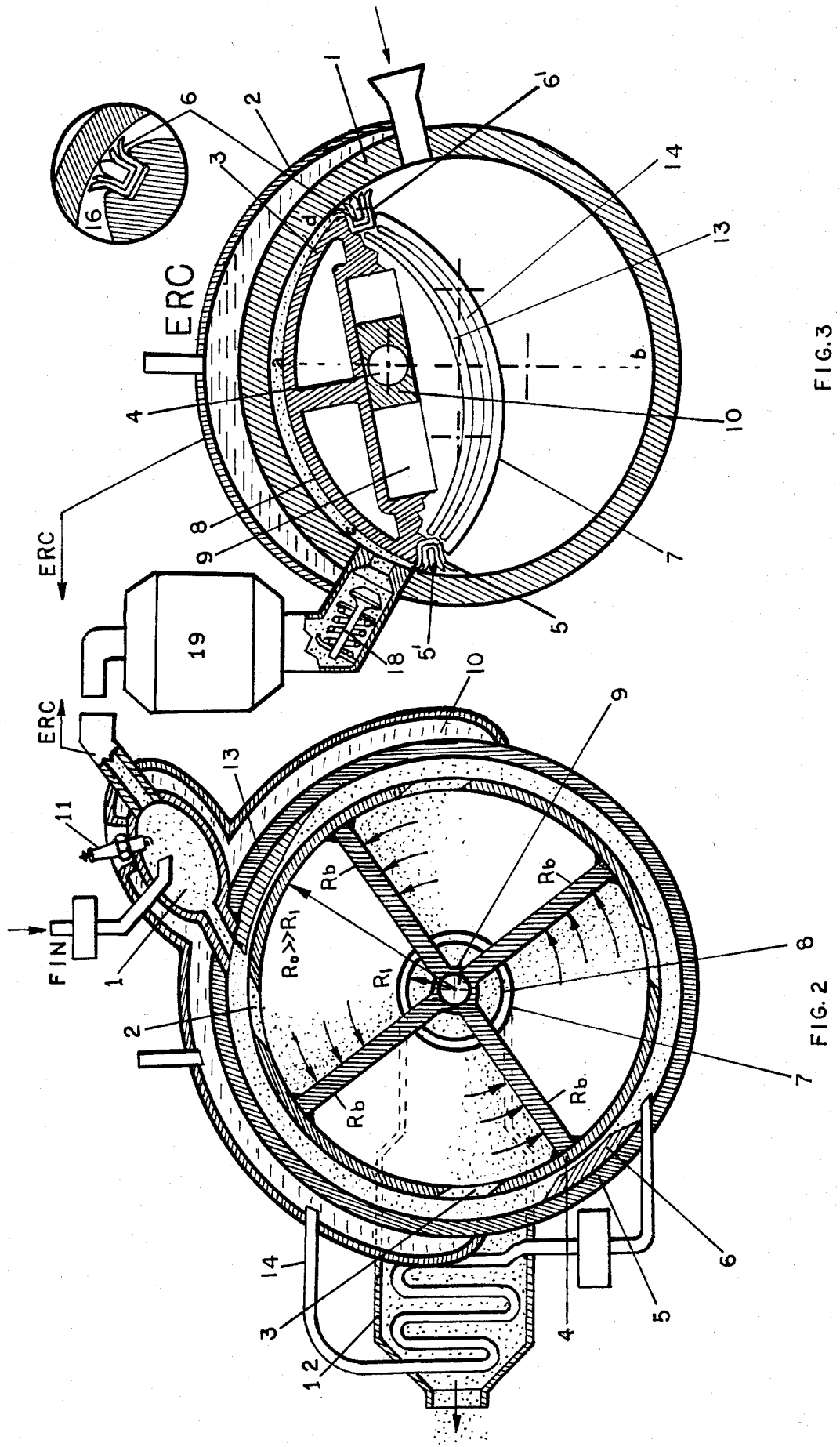

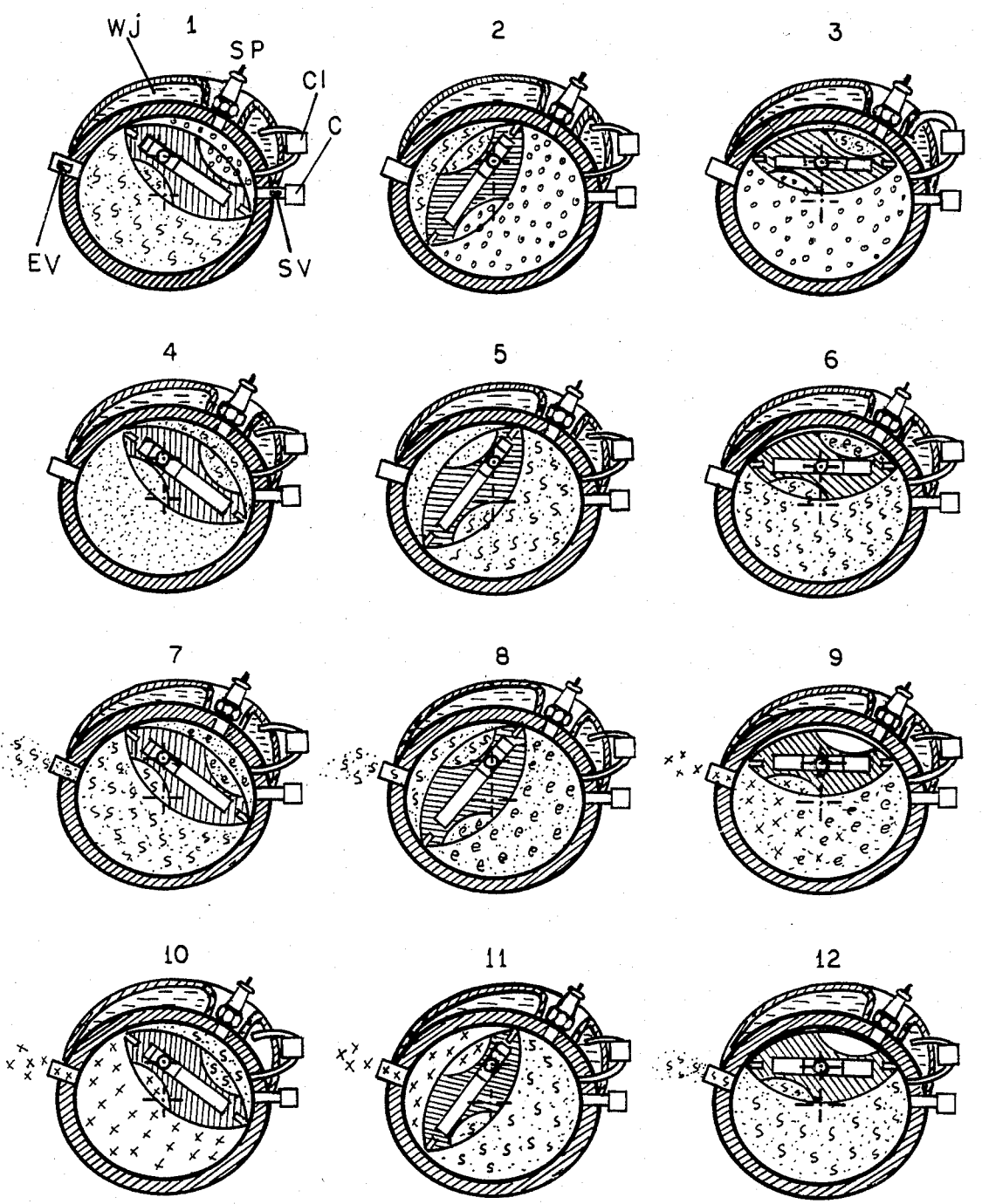
FIG.6(b.)

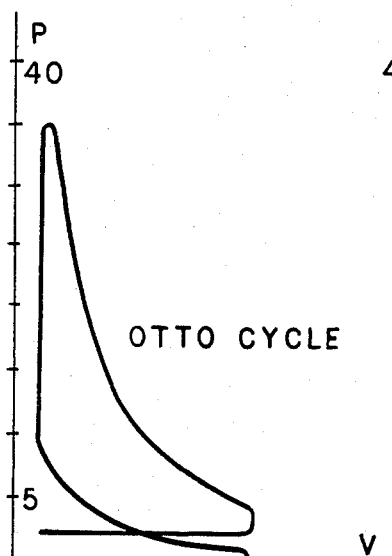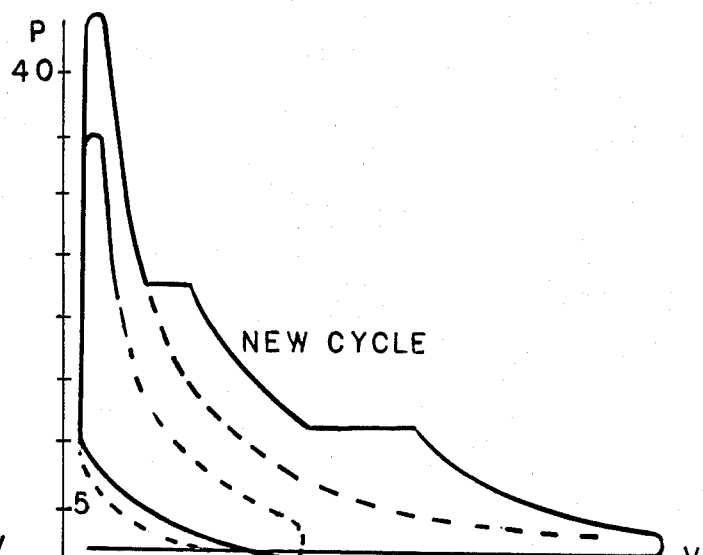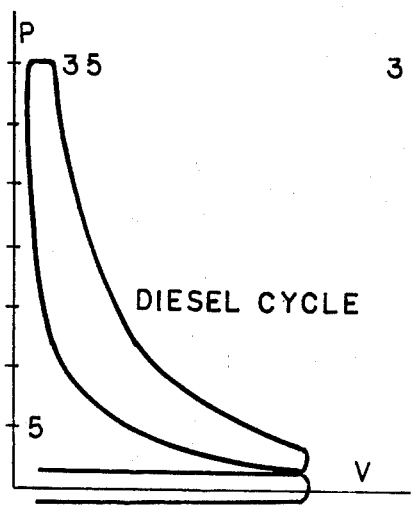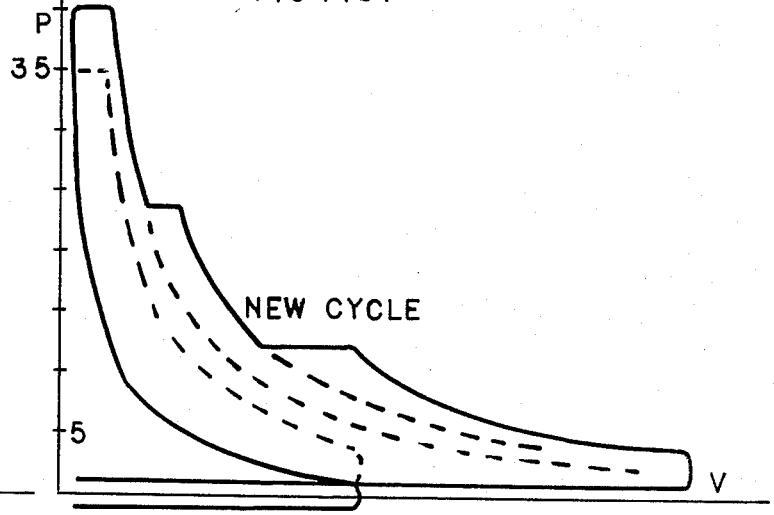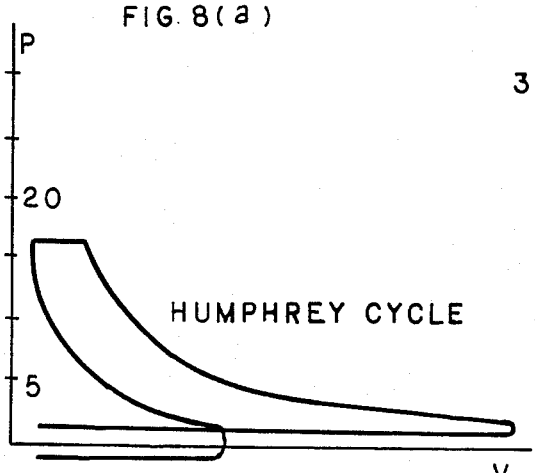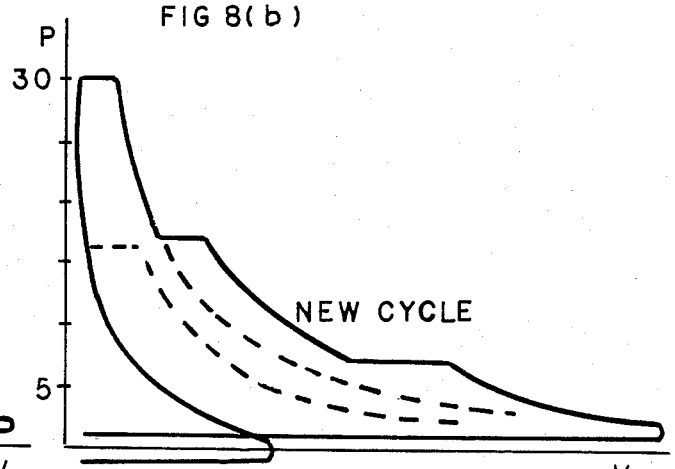

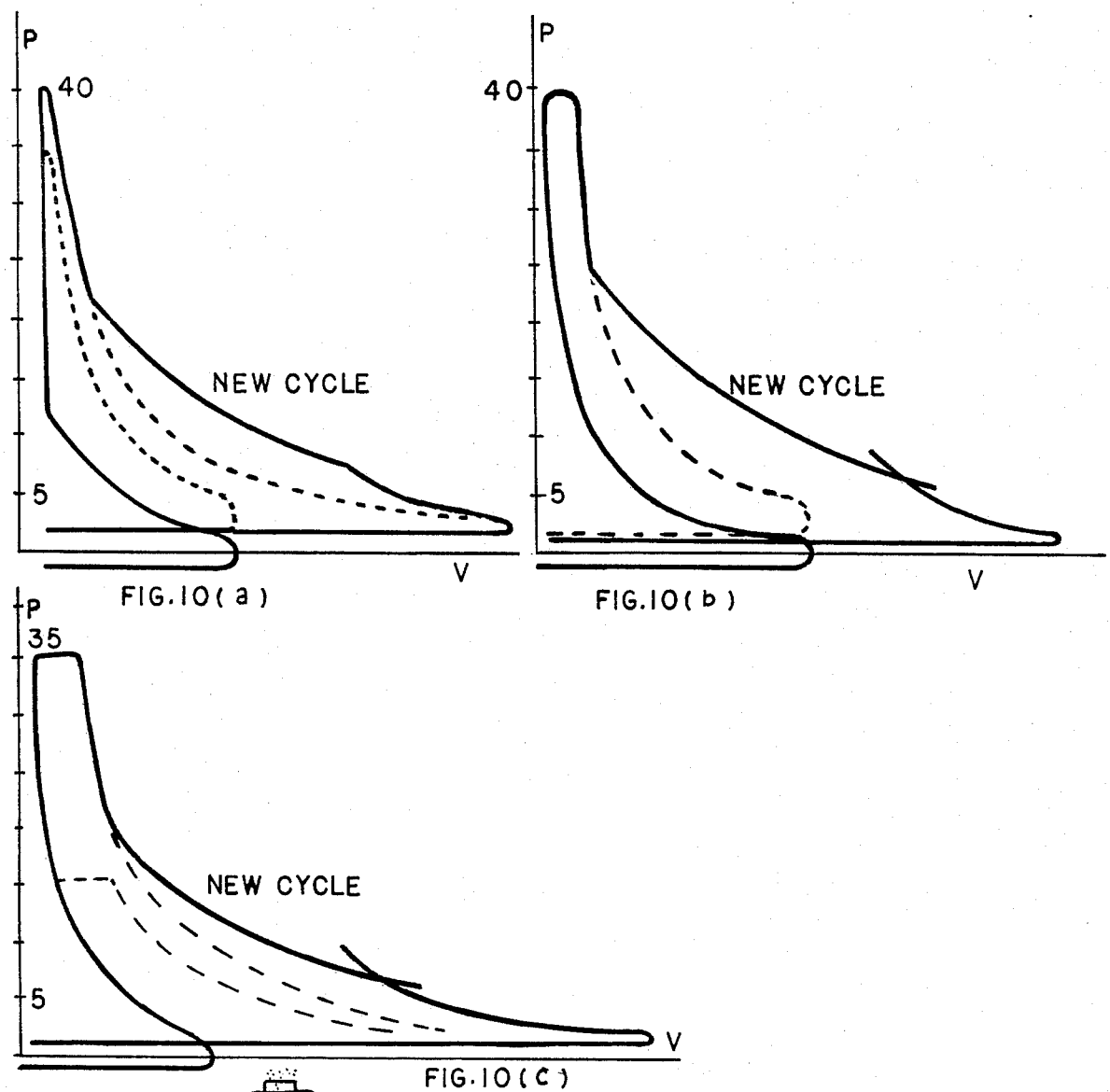
FIG.10(a)
FIG.10(b)
FIG.10(c)
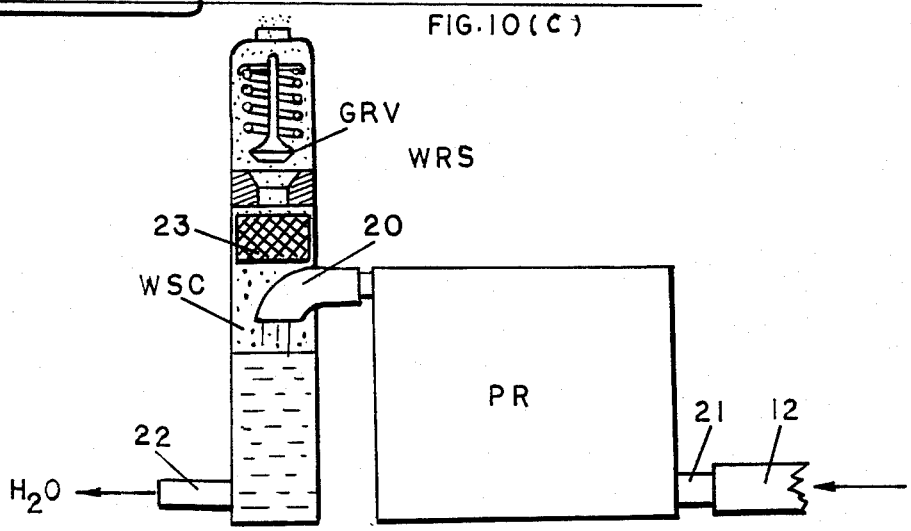
FIG.11

MULTI-FUEL ROTARY POWER PLANTS USING GAS PISTONS, ELLIPTIC COMPRESSORS, INTERNALLY COOLED THERMODYNAMIC CYCLES AND SLURRY TYPE COLLOIDAL FUEL FROM COAL AND CHARCOAL

An important advantage stemming from the employment of my gas pistons, is that they allow the use as a fuel of the new rotary engines, powdered carbon from coal, charcoal and lignite as well as colloidal suspensions of powdered carbon to produce fuel blends of hydrocarbons, alcohols, acetals and water. This way the gas pistons allow one to build multi-fuel internal and external combustion engines for which this invention stands.

The main object of this invention is concurrent employment of my gas piston, my rotary centers of the ellipse and my internally cooled thermodynamic cycles as a technological permit to build oversized multi-fuels rotary engines of ultimate efficiency together with oversized high pressure compressors for the need of the coming synthetic fuels industry.

The coming synthetic fuels industry needs considerable volumes of high pressured air and other gases going up to 500 atmosphers and more and up to 60,000 cubic feet per minute. That requires very large compressors and engines, in the range of 500 to 15,000 H.P, to deliver without difficulties the necessary pressure and volumes. Presumably, however compressors over 1000 H.P. practically do not exist because of price limitations and because the classic engines are very heavy. The present invention is a reasonable solution for such requirements without which adequate synthetic fuel production capable of replacing even partially the huge natural crude oil refining can never be reasonably developed.

A second object is to find a way allowing to use any kind of fuels by the internal combustion engines particularly to allow these oversized rotary engines to be powered directly by powdered carbon from coal, biomass charcoal and lignite in order to reduce the synfuels plant's own expenses for fuel and power generation. An important improvement of the powdered carbon engine fuels, surpassing the old ideas in the matter inherited from Diesel and Rudolph Pavlikowski, is my discovery that colloidal powders from coal lignite and charcoal can be efficiently blended with liquid fuel blends of hydrocarbons, alcohols, acetals and esters almost at any percentage to produce india ink like slurry carbon fuels of superior quality and liquid form.

A third object is to promote the building of more efficient nonpolluting small engines (in the range of 50 to 500 H.P.) for motorcycles, cars and trucks to save money for the motorist and to get rid of the air-pollution.

A fourth object is to find a way to build more reliable advanced aircraft engines surpassing all standards applicable to present day aircraft engines.

A fifth object, but not last of importance, is to introduce my new concept of building engines using my imaginary pistons, my elliptical rotary system and my new thermodynamical cycles allowing to build engines of ultimate efficiency, sophistication and extended length of engine life.

Other objects of the invention will be apparent for those normally skilled in the art.

BACKGROUND AND SHORT THEORY OF THE INVENTION

The idea of using coal powder as engine fuel is now new. Unfortunately it never attained practical performance and realization. When last century, Rudolph Diesel started to build his engine, now known as Diesel engine, he originally wanted to use the coal powder as fuel for his engine. He however failed to devise reliable carburettor for powdered coal. Consequently he switched to the gas oil now known as diesel fuel. Rudolph Pavlikowski, Diesel's friend and collaborator continued the work of the coal powder carburettor. He, by 1915, succeeded to invent a perfectly working carburettor for Otto engines. Unfortunately, when such carburettors were attached to the engines, the engine's life was shortened down to only 200 working hours and in some cases, down to 100 working hours. Pavlikowski found that the shortened life was due to fine sand and other hard particles associated with the coal. Once arriving at the conclusion he began preparing special dust-free powdered coal fuels. That increased the life of the engines up to 500 working hours and to 700 hours when charcoal powder was used. That is again a very short life by present standards. During the second world war the German industry tried to revive the ideas of Diesel and Pavlikowski by producing test engines having cylinders and pistons made from resistant to dust abrasion cementing carbides. That way the life of the carbon powder powered Otto engines was increased up to 1,000 working hours which is again not sufficient for car and trucks, since at an average of 45 miles per hour mixed freeway and city driving such life equals to only 45,000 miles. Wood charcoal was not tested because during the war it was 3 to 5 times more expensive than coal and so it is now. I believe however that charcoal powder obtained from waste biomass like lingin, solid wastes, agricultural and forest wastes should significantly reduce the price of the charcoal powder. With good maintenance of present days trucks one is able to obtain 500,000 miles or more with them. That is more than 10 times the above 45,000 miles of engine life. Subsequent studies in Germany showed that even after a very careful refining of the coal powder to an amount of almost colloidal size hard particles still exist in the solid coal powder as fuel, sufficient to shorten the life of the engine by abrasion. Having in mind the above results, efforts, trials and failure to introduce the coal powder as engine fuel, I found that the best way to avoid the abrasion and the shortened engine life is not to abandon the inexpensive coal and solid wastes powders (which still could be perfect engine fuels), but to get rid of the metal pistons, the oil and the rings of the engine replacing them with gas pistons which can never be damaged by abrasive powders. The powdered coal fuel costs at least 10 times less than present gasoline and the city solid wastes are free of charge and could be converted into powdered charcoal. Consequently it is worth reviving the idea for using the carbon powder as a direct fuel at least for oversized engines and engines for trucks. I found that the radical way to solve the problem is to forget the present day pistons and rings of the internal combustion engine. That way I discovered and hereby introduce my imaginary pistons employed by my new rotary engines—meaning pistons without mechanical parts and abrasive friction. My gas piston is based on the following well established laws and equations:

(a). A rotating body (a rotating gas mixture in the case of this invention) maintains constant its angular momentum $A_m$ unless acted upon by an unbalanced external torque L. (Said torque is termed also MOMENT OF FORCE and is measured: L=force×perpendicular distance from axis to line of action of force). Hence:

$$A_m = I\omega = \text{constant in absence of external unbalanced torque.} \quad (1)$$

(b). In a rotating body (again a rotating gas mixture for this case) the angular impulse $A_i = L \cdot t$ is equal to the change of the angular momentum $A_m$ (produced by an unbalanced external torque action for a time "t" acting upon the body) during which the initial angular velocity $\omega_c$ of the body's moment of inertia changes to a final value $\omega_t$ which is mathematically expressed by the equation:

$$L \cdot t = I(\omega_t - \omega_o) = A_i \quad (2)$$

Taking account that the MOMENT OF INERTIA of the gaseous body (employed by this invention, and regarded as "gas piston"), is equal to:

$$I = m_1 r_1 + m_2 r_2 \ldots + m_i r_i \ldots + m_n r_n = \sum_{i=1}^{n} m_i r_i^2 = mr^2 \quad (3)$$

where; $m_i$ = mass of a given gas molecule; $r_i$ = radius of molecule's rotation, then it becomes clear that the system of equations 1 and 2 is continuously generating unbalanced torque because the moment of inertia of each revolving molecule diminishes from $I = mr_i^2$ down to $I = mr_f^2$ where: $r_i$ = initial trajectory radius and $r_f$ = final trajectoryal radius of the unbalanced torque of the revolving molecule. Therefore, it appears that the effect of the system of equations 1,2 and 3 is the one which is creating the unbalanced torque and forcing the rotating gas to act and behaves like invisible imaginary piston. Obviously whenever a rotating body (gaseous as well as solid) changes its initial radius $r_i$ down to a smaller radius said changing rotation is inavoidably changing the body's moment of inertia I. As a result when said radius of said rotating biody $r_i = r$ diminishes down to $r - \Delta r$ the angular velocity $\omega$ must increase to $\omega + \Delta\omega$ in order to compensate the diminition of the moment of inertia I and thus to respect said conversation law 1. Vice versa when r increases to $r + \Delta r$ then $\omega$ must decrease down to: $\omega - \Delta\omega$ The changes of $\omega$ to $\omega \pm \Delta\omega$ however cause strong clockwise and counter clockwise torque collisions of the molecules upon any body which they may hit as result of which the body becomes accelerated. When all molecules of a gaseous body decrease their trajectorial radii simultaneously the integral torque of the gaseous body will act like a rotating piston. In accordance with law 2 that rotating piston for one molecule is:

$$\pm \Delta L \cdot t = (I \mp \Delta I)(\omega \pm \omega) \quad (4)$$

for a gaseous body of n molecules the integral angular impulse of the gas piston is:

$$\pm L \cdot t = \pm \sum_{i=1}^{n} \Delta L_i t = \sum_{i=1}^{n} (I_i \mp \Delta I_i)(\omega_i \pm \Delta\omega_i) = I_t(\omega_c \pm \omega_t) \quad (5)$$

where $\omega$ and $\omega_t$ are angular speeds of the gas molecules and $I_t$ is the resultant value of $I_i$ for the sum $\sum_{i=1}^{n} I_i$      Equation (5)

is the analytical form of the imaginary piston deduced from formulas 2 and 3, the practical application of which is disclosed further in this specification while disclosing the engine's details. The imaginary piston is interpreted also as a gas piston because (5) is applied to a gas. The theoretical base of my thermodynamical cycles springs from a detailed heat balance of the internal combustion engine, which I made during 1950's. The mechanical system for such realization however followed later after I discovered the rotary centers of the ellipse.

BRIEF DESCRIPTION OF THE DRAWINGS

FIG. 2 is a cross-sectional view of the rotary expander.

FIG. 3 is a cross-sectional view of the rotary compressor.

FIG. 6b illustrates the operating cycle of the internal combustion embodiment of the invention.

FIGS. 7a, 7b, 8a, 8b, 9a, and 9b are comparisons of the new thermodynamic cycles with known cycles.

FIGS. 10a, 10b, and 10c are further thermodynamic cycles.

FIG. 11 is a schematic view of the improved water recovery system.

Figure 1B:
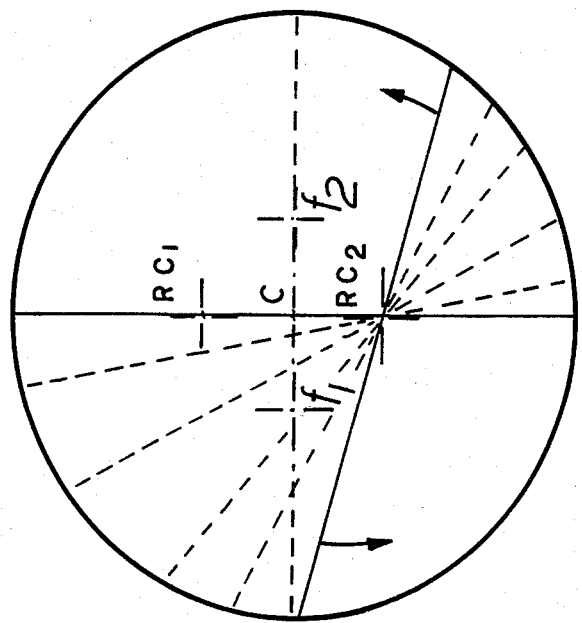
FIGS. 1a and 1b illustrate the rotary centers of the ellipse.
Figure 1A:
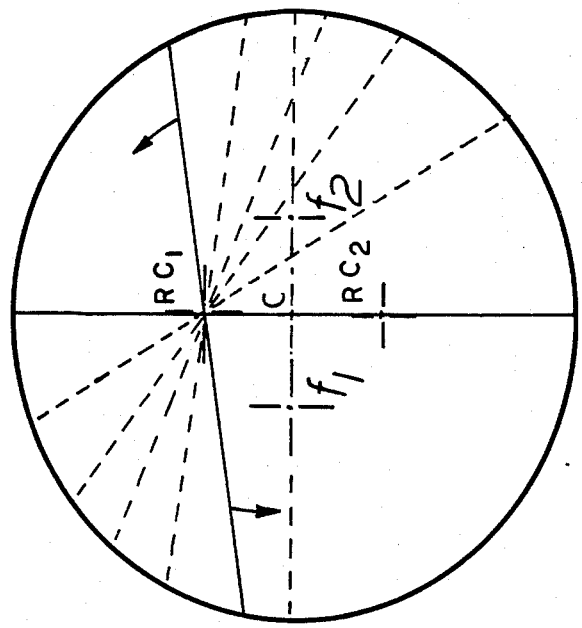

As it is known the NSU-Wankel rotary engine uses a trochoidal stator inside of which is rotated a triangular rotor. That system has the inconvenience that its shaft rotates 3 times faster than the engine's rotor which complicates the transmission system and makes it heavier than the engine itself. Looking for a more efficient and more simplified system I arrived at the discovery that the small axis of the ellipse can be rotated inside of the ellipse using either one of its two rotary centers as conveniently as one can rotate the diameter of a circle inside its circumference. The two rotary centers has nothing in common with the classic focuses of the ellipse nor with its center. I discovered that either one of these two new centers named rotary centers can be obtained when each half of ellipse's small axis is intersected with at least one chord having the same length as that of the small axis of the same ellipse. The employed chord could be any one of the family of the chords having the same length as that of the ellipse's small axis. That definition is shown of FIGS. 1 (a,b) which in the mean time represents the mode of rotation of the small axis of the ellipse around each of its two rotary centers.

THE MECHANICAL DETAILS OF THE INVENTION

FIG. 2 displays the engine device of the multi-fuel rotary power plant converting the heat energy into work through my rotary pistons and internally cooled thermodynamic cycles. The engine is designed to use several different fuels including, in addition to the gasoline and the diesel fuels, also the crude oil and powdered carbon from coal and charcoal prepared preferably into india ink like slurry fuel through blending colloidal size refined carbon powder with hydrocarbons, alcohols and water and blending agents such as acetals, esters and ketons, said water being mainly the residual water contained in any alcohol.

The engine is designed for continuous combustion. That is why it can burn practically any available fuel. The continuous combustion is obtained by enabling the continuous chamber of combustion 1 to receive continuously and constantly pressurized air from the special high capacity Elliptic Rotary Compressor ERC, the details of which are displayed on FIG. 3. The mode of operation of the ERC is given further in this disclosure. The subdevices pertaining to the engine device of the power plant are displayed on FIG. 2 and they are:

(1) a combustion chamber 1 surrounded by (a) a water cooling jacket 10 receiving fresh air from the air outlet of ERC. Said combustion chamber possesses also: (b) fuel injection means ending with a fuel injection nozzle, said means being indicated on FIG. 2 as FIN, (c) ignition means comprising the spark plug 11 used for initiation of the continuous combustion, (d) a combustion chamber gas outlet in the shape of a combustion jet nozzle directing the combusted gases inside the stator of the rotary engine device and (2) a circular stator housing 5 having a water cooling jacket surrounding approximately half of the stator housing closest to the combustion gas inlet. Said water jacket is in fluid communication with the cooling jacket of the combustion chamber. The combustion gas inlet of said circular stator housing is in communication with the combustion chamber through the combustion nozzle outlet. The stator housing possesses also two circular lids one of which is providing, at its center, the exhaust outlet of the stator housing. Said outlet consisting of a circular aperture 8 around the shaft of the engine, to which aperture is fixed the exhaust pipe 12. Inside the exhaust pipe is mounted a heat exchanging (spiral) pipe which is in fluid communication with the water of the cooling jackets through pipe 14.

(3) A hollow cylindrical rotor 4 suspended inside the above stator housing on a shaft 9 passing through the centers of both the rotor and the stator housing's lids, where the shaft is suspended on two roller bearings. The rotor possesses a plurality of inlet port openings (some of them denoted by 2 and 3) along rotor's periphery and is in fluid communication with the exhaust gas outlet 8 of the stator through its own exhaust gas outlet 7 facing the outlet 8. The hollow cylindrical rotor also possesses at least two radially directed rib wall portions Rb dividing the rotor's hollow interior into at least two equal volume compartments such that combustion gases pass through the rotor's inlet ports, strike the rotor's rib walls, which directs the gas propagation toward the engine's outlets 7,8 and 12. That forces the combustion gas to aquire a rotating, spirally shaped jet (of the gas propagation) fitted inside each volume compartment between the inlet ports, the central exhaust outlets, the rib walls and the side lids of the rotor. The gas propagation is centrally headed and the path of the gas propagation represents a flat decreasing spiral called "decreasing" since its radii of curvature are constantly decreasing with the gas advancement toward the central gas outlet of the engine. That kind of gaseous jet propagation combined with the unavoidable concurrent intervention of the law of conservation of the angular momentum of the rotating (spinning) combustion gas by (decreasing the molecular radii) causes the gas to continuously push the rib walls and act upon them like rotating gas pistons. The gas piston effect is appearing as a reaction from the constantly increasing tendency of spinning as a reaction to the constantly decreasing radii of the rotating gas propagation: the increased tendency of faster and faster spining being a must in order to conserve the angular momentom of the rotation of said gas molecules. On FIG. 2 the 6 and 13 are gas stoppers, fixed inside the stator's housing, limiting the admission of the combustion gases into the rotor. To have more ENERGY EFFICIENCY from the gas pistons (in converting the heat energy into work) the radius $R_1$ of the exhaust appertures 7,8 and 12 should be smaller relative to the initial radial distance $R_o$ between the inlet ports openings of the rotor and the center of its shaft, $R_o>>R_i$ sould be at least 5 times larger than $R_i$. That way the incoming hot rotating gas gradually decreases its initial radius of rotation $R_o$ down to the exhaust outlet radius of rotation $R_1$ following said decreasing central spiral. That spiral path of the gas molecules in accordance with the angular difference between the angular velocities of the gas and the rotor could be Archimedes, Hyperbolic or logaritmic spiral. The gradual decrease of the radii of all rotating gas molecules, while tending to be exhausted, drasticly increases the angular velocity of rotation of each gas molecule (resulting from the intervention of laws 1 and 3) from their initial angular velocity $W_o$ down to their final value $\omega_t=\omega_1>>\omega_o$ at the exhaust. That drastic increase in accordance with equation 5 creates the unbalanced torque and the rotary pushing upon the rib walls $R_b$ of the rotor $$L \cdot t = I_i(\omega_t - \omega_0) \qquad (6)$$

pushing and pressing the ribs like a rotary gas piston during the gas' residual time "t" inside the rotor $T = t - t_o$. During that push the large initial moment of inertia $I_o$ of every molecule $m_i$ is drasticly reduced down to $I_t << I_o$ because the radius $R_i$ of $I_f$ is a second power in the formula of the momentum of inertia of the rotating molecules $$I_i = m_i R^2 \qquad (7)$$

All this means rapid conversion of the internal (and the kinetic) energy of the rotating gas into work. That is because the decrease of the momentum of inertia, in accordance with the rotary equations, $$E_k = \tfrac{1}{2}I\omega^2 (E_k = \text{Kinetic energy})$$

and $$W = L.\theta I \frac{\omega_t - \omega_o}{t} \theta_i$$

($W$ = work; $\theta = \frac{s}{r}$ = angular displacement in radians)

means the exhaust of the rotary energy of the gas molecules through conversion of that energy into mechanical work W. The usual working parameters of the engine are 40 to 65 atmospheres of continuous pressure supplied by the ERC, 35 to 60 atm. pressure inside the combustion chamber and 100 atm in the fuel inject nozzle FIN. The so described engine displayed on FIG. 2 looks at first glance more or less like a gas turbine. That is however an illusion. The new engine is not turbine because it does not have the turbine's series of rotary blades (scoops)—an attribute of any turbine. In additional, a gas turbine works quite differently from my gas pistons rotary engine since, in a turbine all mechanical energy is obtained by the turbine's blades from the linear mechanical impulse of the gas jet without the intervention and the utilisation of equation (5) for the turbine does not have the spirally rotating gas pistons.

Another important difference between the disclosed multi fuels rotary power plant and the gas turbine resides in the introduction and the utilisation of my elliptical rotary concept employed to create the remarkable elliptical rotary compressor ERC of the multi fuel plant as displayed on FIG. 3. The advantage of that compressor is that it is light as a turbocompressor but yields pressure as high as that of the piston compressors. Another advantage is that the ERC theoretically requires zero torque at its maximum pressure (of each revolution), while a piston compressor requires always maximum torque for maximum pressure. That is because at the maximum pressure phase of each revolution the shaft of my elliptic compressor is symmetric relative to its rotor's extremities. Resulting from that symmetry the compressed gas is pressing equally upon the left and upon the right portions of the elliptical rotor of said elliptical compressor. The Elliptical Rotary Compressor (ERC) as a device of the multi fuel power plant is based on the two remarkable rotary centers of the ellipse discovered by me for the purpose of this invention. The details of the ERC displayed on FIG. 3 are:

(4) an elliptical stator housing 1 with an air inlet 17 and a compressed air outlet opposite the air inlet. Said compressed air outlet possesses a check valve 18 to prevent reverse flow of the air and a water cooling jacket 2. The compressed air outlet is connected with the air damper 19 representing an air tank needed to eliminate the pressure pulses of the compressor in order to supply continuously and constantly pressured air to the combustion chamber of the engine. The compressor further posseses an elliptical rotor 7 (given also by its cross section 3) having a central hollow rectangular hole 9 inside of which is placed the shaft 4 of the compressor. The shaft is rectangular through its lenght covered by the elliptical rotor as shown by 10 and is shaped so as to permit free rotation of the rotor through the shaft. Outside of the rotor the shaft is round and suspended by two roller bearings into the side lids of the stator housing. The roller bearings of the suspension are fixed such that the rotor shaft must pass through one of the rotary centers of the elliptical stator housing. Only in that way the elliptical rotor of the compressor can rotate inside the elliptical stator housing as conveniently as one can rotate a circular rotor inside a circular housing (as it is the case with FIG. 2). The elements 5,5′ and 6 (magnified separately in 16) as well as 13 and 14 are sealing elements, made out of beryllium, bronze and titanium, located at the sides and the ends of the elliptical rotor to form a gas tight seal between the rotor and the stator housing. The elliptical sections 7 and 8 of the rotor are same as the elliptical portion c-a-d of the stator housing. That is to avoide dead compression volume, thus, to obtain maximum compression effect.

Figure 4:
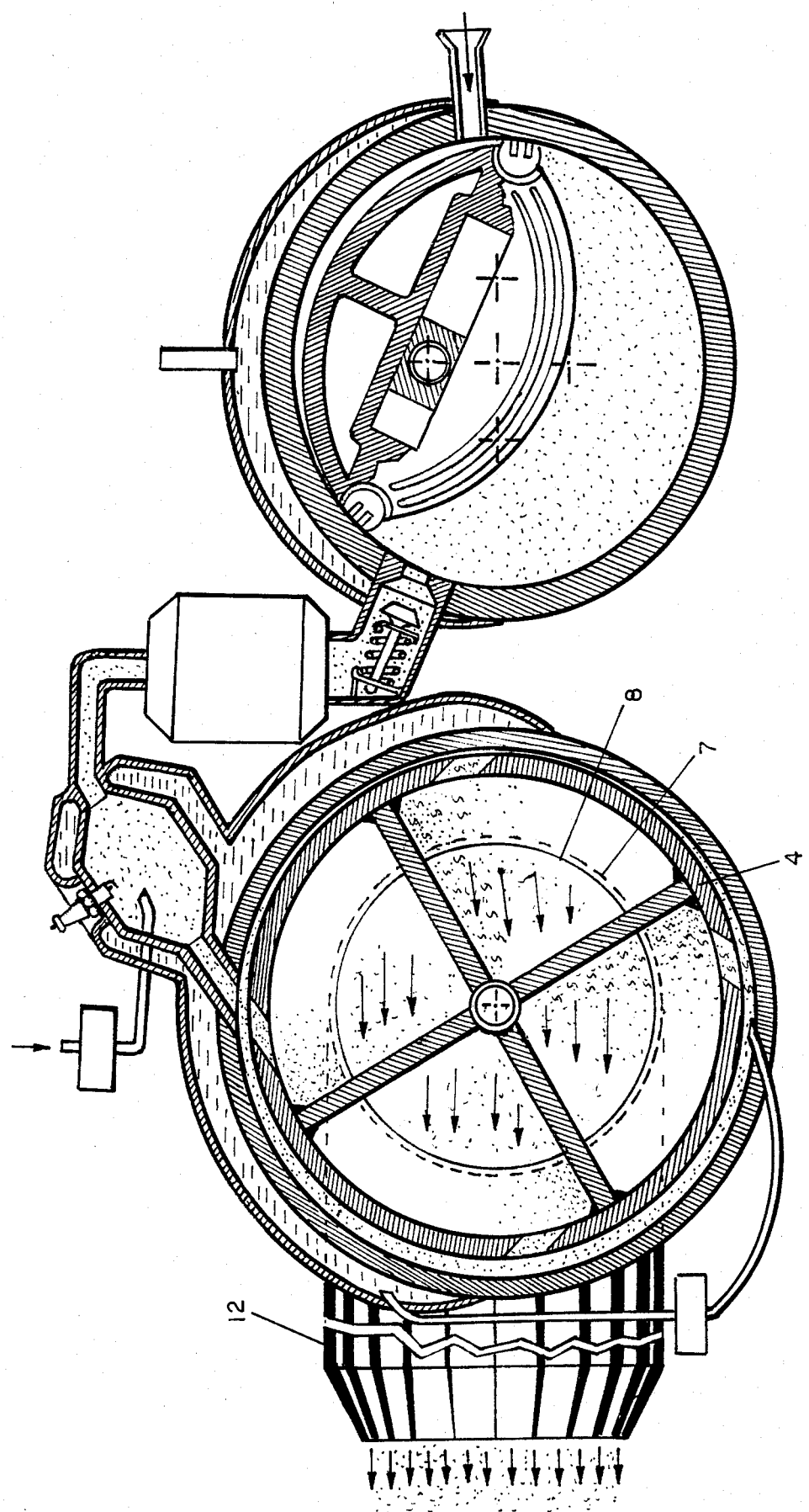
FIG. 4 is a cross-sectional view of the jet propulsion embodiment of the invention.

The multi-fuel rotary power plant functions by connecting the power output shaft 9 of FIG. 2 with the compressor's shaft 10 of FIG. 3, as well as with: the fuel injection means, the ignition means and the hot water injection means (serving to change the the thermodynamical cycle of the engine as that is clarified further in this disclosure). Hence, rotating the power output shaft 9 puts into action all of the above supplemental means of the rotary power plant. The power output shaft provides concurrently the necessary drive for the utilization of the produced work. Since the combustion process of the described engine is continuous, it can burn efficiently any kind of fuel including heating fuel, crude oil and powdered coal. As already mentioned even the best refined coal powder, used as fuel in internal combustion engines, causes abrasion. Replacing the pistons by gas pistons and eliminating the lubricating oil (oil is a collector of abrasives) eliminates the abrasion. A second cause for the elimination of the abrasion is the elimination of the metal friction by abandonment of the metal pistons and rings. When powdered coal is used as fuel, the best carburettor is the mentioned carburettor of Pavlikowski which is well described in the literature. For carbon powder blended with liquid fuels the best fuel system is the pressurized fuel injection. Finally, if gasoline is used as fuel one could employ the current automobile carburettors. FIG. 4 represents a modification of the above described gas piston engine for jet propulsion purposes. The modification is a simple and effective one. It consists of the following; the exhaust apertures 7 and 8 and that of the exhaust pipe 12 are now made so oversized that most of the energy developed during the burning process is exhausted like a jet propulsion thrust reducing the angular (rotational) energy of the rotor 4 down to a very low level, needed only to power the necessary compressor. As a result the linear propulsion thrust delivers the main portion of engine's energy. For more clarity on FIG. 4 the air compressor is shown next to the jet propulsion engine. On practice however it is connected directly to the rotating shaft of the propulsion engine. Another modification is that in the case of the jet propulsion there is no heat exchanger inserted in the exhaust pipe because the pipe on FIG. 4 is converted to jet propulsion pipe.

Figure 5:
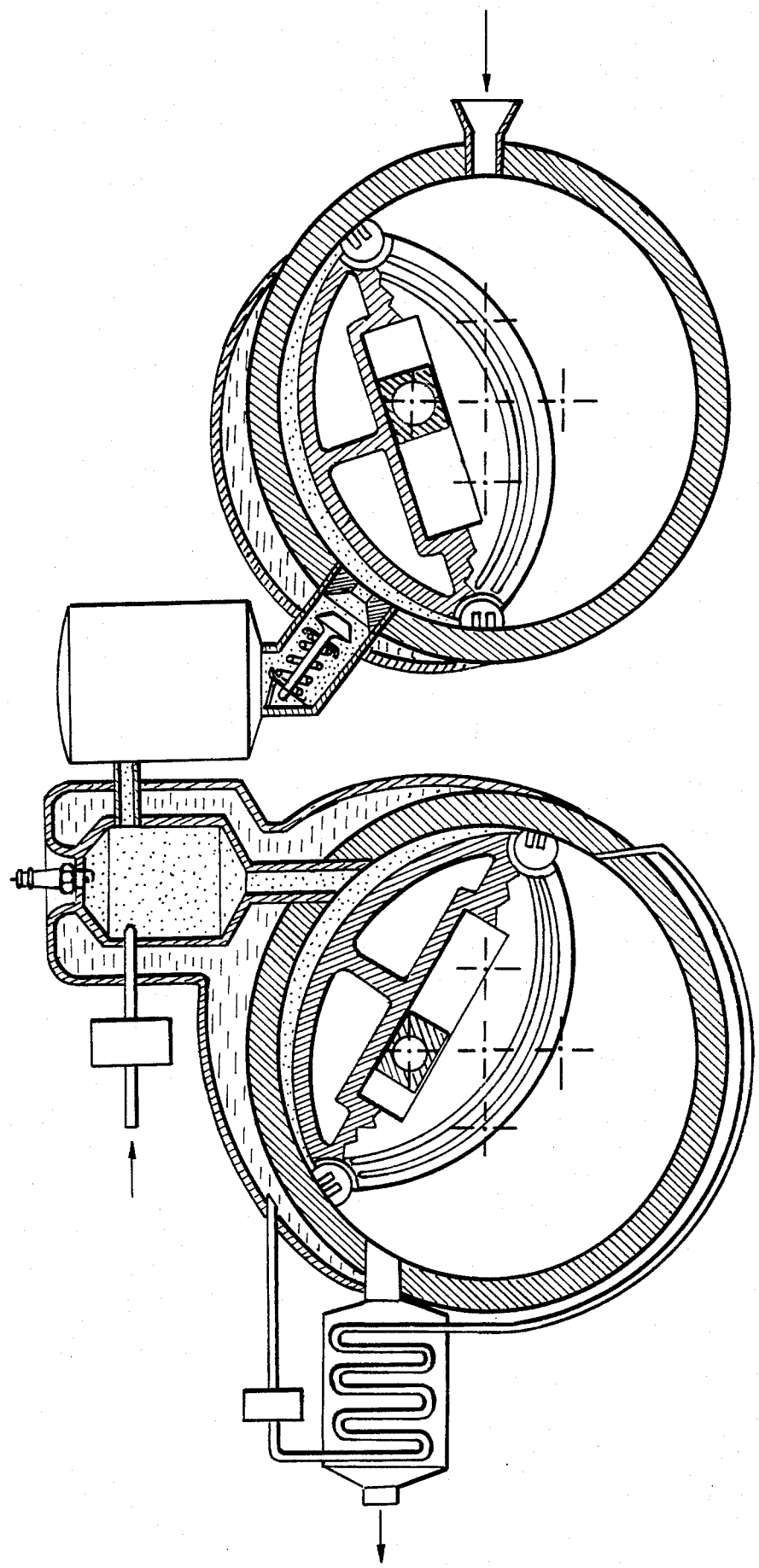
FIG. 5 is a cross-sectional view of another embodiment of the invention.
Figure 6A:
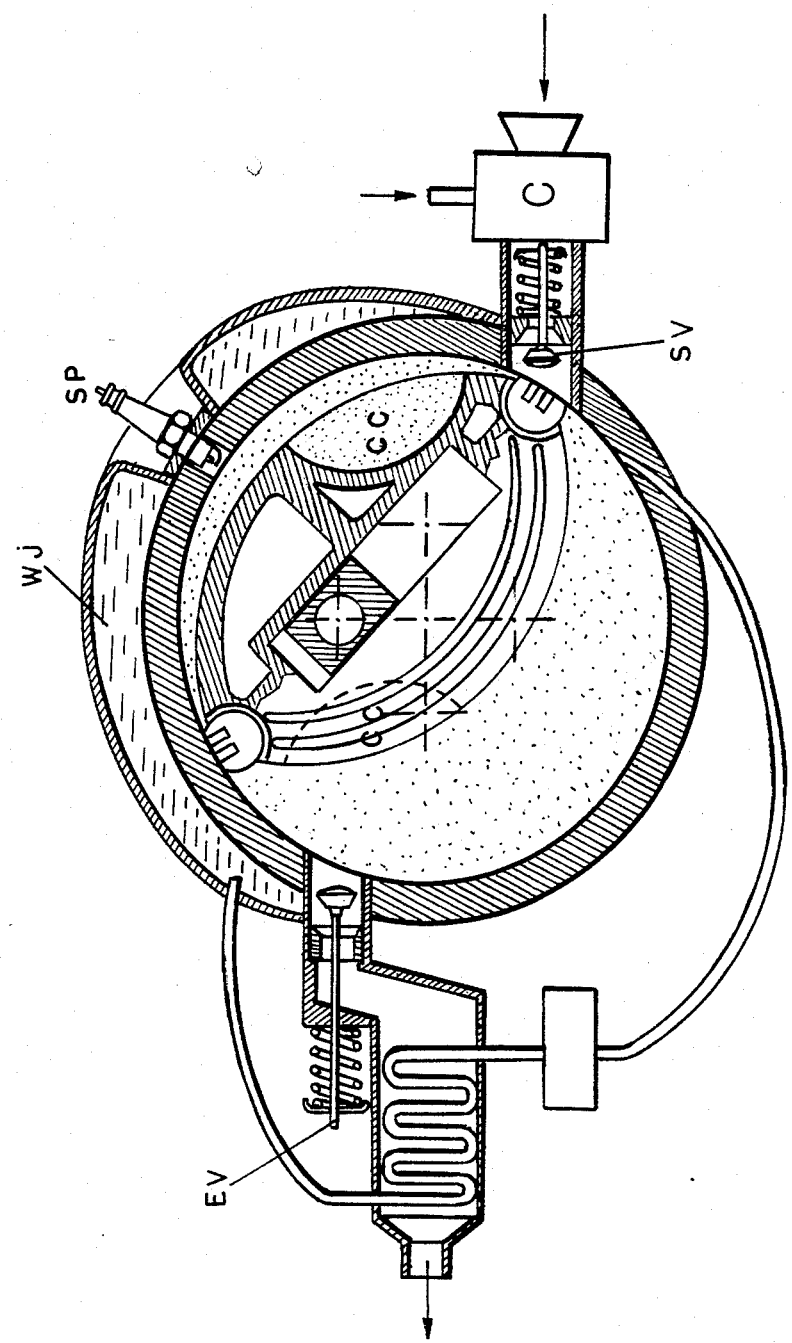
FIG. 6a is a cross-sectional view of an internal combustion embodiment of the invention.

FIG. 5 represent: an internal combustion engine in which both the engine and the needed compressor use my elliptical rotary system described in detail in connection of FIG. 3. The possibility to use the elliptical rotary system as main energy delivering device is obvious from FIG. 5, FIG. 3 and this disclosure. The elliptical rotary system can be effectively used also as hydraulic engines, powered by compressed air or by pressured liquids. Hydraulic eliptical rotary system can eliminate the need for differential and transmission systems in cars. Such small powerful hydraulic engines can be fixed directly on car's rear wheels whose speed of rotation can be drived simply by changing the flow of the liquid fluid. The engine on FIG. 5 is again of continuous combustion type able to burn any kind of fuel including raw crude oil. Since the engine uses a continuous combustion process it can burn also powdered coal. However for powdered coal it is better to use in the engines of FIG. 2 and FIG. 4, in order to avoid a shortening of engine's life due to the abrasives contained even in well refined coal power. FIG. 6(a), represents an elliptical rotary engine in which one same elliptical rotary device is used as compressor and as engine similar to the present piston engines and the NSU-Wankel rotary engine. Such engine needs the same ignition system and fuels like the classic engines because it is not of continuous combustion. Only the continuous combustion can employ any kind of fuel FIG. 6(a) is for an explosion type engine. Like all engines shown on FIG. 2 to FIG. 5 it employs internal hot water cooling. The mode of operation of the engine is shown through the 12 small diagrams given in FIG. 6(b). The combustion chambers c c of that engine are two and are built inside of the rotor; the spark plug however is fixed in the stator. By reducing the volumes of the two combustion chambers the engine can be easily converted into a Diesel type rotary engine. The gas piston rotary system of FIG. 2 can be efficiently used as another type centrifugal air and gas compressor system replacing the turbocompressors, and their multiple blades as unnecessary and expensive. Such compressors can find many applications, however they are not convenient as compressors for rotary engines because at normal size of rotor's radius they can not develope a pressure as high as that of the compressor given on FIG. 3. One will need two or three stages to reach the compression of the elliptical rotary system.

THE INTERNALLY COOLED THERMODYNAMIC CYCLES

The rotary power plant, as well as all other rotary engines derived from this power plant design use my new internally cooled thermodynamic cycles. The advantage from that is better cooling, extending the life of the engine and better fuel efficiency coming from the conversion to additional work that portion of the heat which is now lost through the exhaust pipes of the classic engines and their radiators. The new cycles are obtained from capturing that exhausted heat through the water cooling jackets of the rotary power plant and the heat exchanger inserted into the exhaust pipe. That otherwise lost heat represents ⅔ of the total heat available in the fuel. I found that the way for saving the enormous energy is to gradually inject the hot water generated by the cooling jackets and the exhaust heat exchanger into the working volume of the engine. That injection should be somewhat farther from the combustion chamber to avoid interference with the combustion. The combusted gases in the working wolume of the engine are so hot that the injected hot water becomes instantly converted to preheated steam. That produces: additional motive fluid force, increased thermodynamical efficiency and complete internal cooling of the engine without the need for radiator, and without a need for boiler to produce the steam. Assuredly all of the above changes the chemical composition of the working gaseous body. It becomes thus a mixed gas and steam body, and the classic thermodynamical cycles become internally cooled thermodynamic cycles of higer heat to work conversion efficiency. The hot water injection inside the engine is performed through means for injecting the hot water consisting of pressure pump, injection nozzle and pipes (connecting the pump with the water cooling jackets and said nozzle). The internal cooling of the explosive type rotary engine shown on FIG. 6(a) is diagramatically displayed in details through the 12 phase diagrams shown on FIG. 6(b). Thus phases 1,2, and 3 represent the intake of fresh combustion mixture through the open inlet valve "SV" and the carburettor "C" during which the hot water cooling injector "CI" is shut. The compression starts with phase 4 and ends with phase 6, during which the pressure increases from 1 atm. to 12 atm. During the ignition the exhaust outlet valve "EV" is shut. The ignition of the compressed gas mixture is done during phase 6 prompting the gas explosion and increasing, almost instantaneously, the pressure from the 12 atm. to about 40 atm.; that causes the conversion of the internal energy of the fuel to work. The engine work on account of the expansion starting with phase 7 which continues till phase 9. During the expansion both "SV" and "CL" are shut down. The exhaust of the combustion products starts with phase 10 for which the exhaust valve opens and continues to be open till phase 12. Phase 10 starts equally the internal cooling of the engine by opening the cooling injector "CI".

The cooling injection pump "CI" injects hot water at 80° C. to 110° C. inside the engine at a pressure of 5 to 10 atm. The hot water comes from the water cooling jacket of the engine formed by the jacket "WJ" and the stator of the engine. The hot water injected under pressure diffuses to tiny droplets which immediately evaporate generating a cooling steam which cools down the engine to around 105° C. The generated steam pushes the rotor of the engine providing additional motive fuid force upon the rotor generating additional work while cooling the engine. The hot water injection continues till phase 11, and the expansion of the cooling steam continue till phase 12. The engine does not have a radiator because it is adequately cooled internally. For better thermal efficiency part of the hot cooling water is obtained from a water heater heated by the exhausted gaseous producuct of combustion as shown on FIG. 2, FIG. 5 and FIG. 6(a). As a third round for heat efficiency some additional hot water is injected inside the engine also during the expansion process starting with phase 8 and ending the injection by the phase 9. As a result of the internal cooling the engine performs similtaneously overlapped and superimposed thermodynamic cycles, both of them being mixed gas and steam cycles. The first of them, starting with phase 1 and ending with phase 12, is similar to the Otto cycle but it is not a true Otto cycle because it is gas cycle only from phase 1 to phase 8. From phase 8 to phase 12, it's a mixed gas/steam cycle. Such a cycle is better than the Otto cycle because after the injection of hot water (during phase 8) the adiabatic curve of the expansion is converted to isothermic expansion allowing additional work. This new thermodynamical cycle is shown on FIG. 7(a). The first hot $H_2O$ injection starts by phase 8. The second hot $H_2O$ injection, performed by the same engine, starts with phase 10 and ends with phase 3 during which all generated steam is exhausted. The second injection looks more like a Rankine cycle. However it is not Rankine cycle because is performed with mixture of steam and burnt gas left in the combustion chamber from the previous cycle. As a result the steam cycle starts at much higher temperature than the Rankine cycle. The expansion of the steam-gas mixture follows a polythrope thermodynamicly situated between the adiabate and the isotherm. As a result from the higher starting temperature and the polythrope, the efficiency of the cycle is higher than the efficiencies of the Otto or the Rankine cycles. This mixed steam-gas explosion cycle is presented on FIG. 7(b). Because the $H_2O$ cooling contributes to the efficiency of the engine it is obvious that the final efficiency is much higher compared with that of Otto's cycle and the Otto engine. When the same engine is provided with a fuel injection system instead of a carburettor and when the initial compression of 12 atm. is increased to about 50 atm., through decreasing the volume of the combustion chamber, the rotary engine will produce another new thermodynamical cycle of internal cooling which is a mixed gas-steam Diesel like cycle, but better than the Diesel cycle for the same reason as above, due to the hot water internal cooling process. That new thermodynamical cycle is also a Rankine looking cycle but starting at a much higher initial temperature and pressure than both in the case of the spark plug ignition and Rankine cycle. The new thermodynamical cycle is given on FIGS. 8(a,b) which without internal cooling produce thermodynamical cycles similar to the turbo cycle of Humphrey.

When the internal cooling is applied to engines working on the Humphrey cycle that produces internal cooling Humphrey like cycles of superior effiency, using mixed gas-steam and steam-gas working fluid. That new cycle is given in FIGS. 9(a,b).

Finally it becomes clear that the new process of internal cooling applied to the internal and external combustion engines changes for better all classic thermodynamical cycles, including the not mentioned cycles of Sabatier (the semi Diesel cycle) and Brayton (another turbo cycle). The hot water cooling shown on FIG. 7(b) and FIG. 9(b) is obtained by two relatively small volume, short time injections of water. Because the evaporation of the water into wet steam is always both an isothermic and isobaric process the cooling portions of the above cycles is simultaneously isothermic and isobaric. Such property is excellent for obtaining high efficiency and high torque from an engine because the isothermic process is the most efficient one and because the isobaric process allows maximum constant torque. When however the injection of the water is conducted continuously by small amount of $H_2O$ insufficient to create but sufficient to follow the limit between the dry and wet steam one can obtain another plurality of mixed gas-steam internally cooled cycles having isothermic process of expansion which is not any more an isobaric process. These new plurality of thermodynamic cycles are represented by FIGS. 10(a,b,c). Once again the same plurality can be extended to include and modify the thermodynamic cycles of Sabatier and Brayton.

The main advantage of my elliptic rotary system used as compressor is that it needs zero torque at its maximum compression which allows one to use very low torque motors for obtaining high pressure, high R.P.M. and very smooth work. Such a thing is impossible to obtain by the present day piston and rotary compressors. Other advantages are that the elliptical system allows perfect static and dynamic balancing of the compressors or the engines, leading to large volume capacity per minute plus excellent cooling. The better cooling allows one to build high pressure compressors entirely from stainless steel and make them resistant to corrosive vapors and gases a feature which can not be obtained with pistons or by the present rotary compressors.

A last improvement of the invention is the Water Recovery System—W.R.S. shown on FIG. 11. The main devices of that system are: the pressurized automobile type radiator PR; the water separating column WSC and the gas release valve GRV all shown on FIG. 11. The water recovery system works at a pressure in the range of 1.5 to 2.5 atmospheres for which the gas release valve is carfully adjusted. The water separating column is connected to the radiator through the pipe 20. The radiator does not work as in todays cars but instead of that is connected with the exhaust pipe 12 of the engine through pipe 21. That way the radiator is fed not with water but with a gas and steam mixture exhausted by the engine. While passing through the radiator the gas and steam mixture get relatively cooler. That combined with the pressure of about 2 atmospheres condenses the steam into water droplets which when passed into the water separation column WSC separates from the exhausted gas. The obtained hot water in the temperature range of 80° C. to 100° C. is returned back to the water cooling jacket of the engine through pipe 22. The separated gas mixture consisting almost exclusively of $N_2$ and $CO_2$ is exhausted in the atmosphere through the gas releasing valve GRV. Element 23 in FIG. 11 represents a water filter preventing the exhaust of the small water droplets in the atmosphere.

What I claim is:

1. A continuous combustion chamber rotary power plant using: a colloidal carbonaceous fuel, a special elliptically shaped rotary compressor, gas pistons, a circular rotary device housing said gas pistons and special internally cooling thermodynamical cycles comprising:

(1) a rotary compressor, based on my rotary centers of the ellipse, having an elliptical stator housing with an air inlet and a compressed air outlet opposite the air inlet, a check valve in said compressed air outlet to prevent reverse flow of the air, said compressor further having an elliptical rotor, suspended on a shaft passing mandatory through one of the two rotary centers of the elliptic cross section of the stator housing, said rotor having also two sets of sealing elements located on the sides and the ends of the elliptical rotor to form a gas tight seal between the rotor and stator housing;

(2) a combustion chamber surrounded by a cooling jacket receiving compressed air from said compressed air outlet, said combustion chamber having a fuel injection means and ignition means for the continuous combustion of a colloidal carbonaceous fuel with the compressed air, said combustion chamber further having a combustion gas outlet for directing the combustion gases to said circular rotary device;

(3) said circular rotary device housing the gas pistons, having a circular stator housing and a water jacket surrounding approximately half of the engine's stator housing, said water jacket being in fluid communication with the cooling jacket of the combustion chamber, said stator housing having a combustion gas inlet in communication with the combustion gas outlet of said combustion chamber and an exhaust gas outlet located in the center of stator housing, said water jacket further being located such that it surrounds the portion of the stator housing closest to the combustion gas inlet, said rotary engine further having a hollow cylindrical rotor having inlet ports along the rotor's periphery and being in fluid flow communication with the exhaust gas outlet of the stator housing, said hollow cylindrical rotor also having at least two radially extending rib wall portions dividing the rotor's hollow interior into at least two equal volume compartments such that combustion gases pass through the rotor's inlet ports strike the rotor's rib walls which directs the gas propagation toward stator's central exhaust outlet, forcing the gas to acquire a rotating spiral propagation shape, fitted inside the rotary volume compartments between the inlet ports, the ribs and the rotor's central exhaust outlet, more precisely the gas rotation acquiring a decreasing spiral path which together with the unavoidable and concurrent intervention of the law of the conservation of the angular momentum of the spirally spinning gas causes the gas to continuously push the rotor's ribs and act upon them like rotating gas pistons, till the exhaust of the rotating gas, causing the rotor to rotate as the combustion gases exit through the stator's central exhaust gas outlet, (4) said rotary engine further having means for internal cooling and deriving from the cooling additional work through converting the classic thermodynamical cycles into the better internally cooling thermodynamical cycles, performed by enabling the engine to preheat the water of the cooling means to boiling temperature inside the engine's jackets and exhaust pipe, then injecting that hot water, through means for injecting, into the stator housing diametrically opposite the rotary engine's combustion gas inlet, where said injected hot water becomes instantly vaporizing and preheated by the combusted gases, thus obtaining while cooling additional motive fluid force on the rotor's rib walls, which changes the classic thermodynamical cycles into the more heat efficient, steam and combustion gases mixed, internally cooling cycles without the need for boilers, the vaporized water then exiting through the stator's central exhaust gas outlet;

(5) a power output shaft, suspending the engine's rotor inside the engine's circular stator housing, connected with the shaft of the elliptical compressor, with the fuel injection means, with the ignition means and with the hot water injection means, to drive the air compressor, the fuel injection, the ignition, the hot water injection prompting the new thermodynamical cycles, said power output shaft providing also drive and additional energy from the mixed gas and steam pistons and cycles for universal use and multi-fuel application of said continuous combustion chamber of this new power plant.

2. The continuous combustion rotary power plant of claim 1 having a colloidal carbon fuel consisting of finely divided and purified carbon power blended with liquid hydrocarbons, alcohols and water through blending agents such as acetals, esters and ketons to form an india ink like non clogging slurry fuel of high performance and low price, the water being mainly residual water from the alcohols.

3. A continuous combustion rotary power plant according claim 1 wherein said exhaust pipe and exhaust outlet are enlarged by expanding the apertures of said pipe and outlets as well by increasing the length of the exhaust pipe and eliminating its inside heat exchanger, whereby said power plant can operate as jet propulsion power plant.

4. A continuous combustion rotary power plant according to claim 1 wherein the rotary compressors sealing elements further comprise:

(1) two small diameter half cylindrically shaped roller sealing elements the roller sealing elements being double grooved throughout their entire length and each having two smaller additional sealing elements, each sealing elements assembly being inserted at the ends of the rotor and (2) elliptically shaped side sealing elements inserted at the sides of said rotor thus, to form together with said roller sealing elements a gas tight seal between the rotor and the stator.

* * * * *